US012597775B2

(12) United States Patent
    Sakurai

(10) Patent No.: US 12,597,775 B2
(45) Date of Patent: Apr. 7, 2026

(54) CONTROL DEVICE

(71) Applicant: HONDA MOTOR CO., LTD., Tokyo (JP)

(72) Inventor: Takayuki Sakurai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/001,630

(22) Filed: Dec. 26, 2024

(65) Prior Publication Data

US 2025/0219420 A1    Jul. 3, 2025

(30) Foreign Application Priority Data

Dec. 27, 2023    (JP) ................................. 2023-220638

(51) Int. Cl.
    *H02J 3/32*        (2006.01)
    *B60L 53/62*       (2019.01)
    *B60L 53/63*       (2019.01)
    *B60L 55/00*       (2019.01)
    *H02J 7/00*        (2006.01)

(52) U.S. Cl.
    CPC .............. *H02J 3/322* (2020.01); *B60L 53/62*
        (2019.02); *B60L 53/63* (2019.02); *B60L 55/00*
            (2019.02); *H02J 7/00032* (2020.01); *H02J*
                                      *7/0071* (2020.01)

(58) Field of Classification Search
    CPC ...... H02J 3/322; H02J 3/32; H02J 7/00; H02J
                    7/00032; H02J 7/0071; B60L 55/00;
                                 B60L 53/63; B60L 53/62
    See application file for complete search history.

(56) References Cited

U.S. PATENT DOCUMENTS

2020/0231059 A1    7/2020   Hishida et al.

FOREIGN PATENT DOCUMENTS

JP          6913114 B2      8/2021

*Primary Examiner* — Robert L Deberadinis
(74) *Attorney, Agent, or Firm* — Paratus Law Group, PLLC

(57)            ABSTRACT

A control device for controlling charging and discharging of power storage systems includes: an acquisition unit configured to acquire an intention to participate in a DR for adjusting a power supply and demand balance in a power grid from consumers when the DR is contracted in a power transaction; a resource ensuring unit configured to ensure, from the power storage systems, a power resource that the power storage systems are able to supply to the power grid during an execution period of the DR; a plan formulating unit configured to adjust a charging state of each of the power storage systems during a preliminarily controllable period that is a predetermined period before a start of the DR and formulate a plan for increasing the power resource able to be supplied during the execution period; and a communication unit configured to transmit the plan to the power storage system.

7 Claims, 12 Drawing Sheets

| UP DR PREVIOUS DAY | | | UP DR EXECUTION DAY | |
| BIDDING ACCEPTANCE PERIOD | CONTRACT PROCESSING | RESULT NOTIFICATION | UP DR COMMAND | |
| | | FORMULATE CHARGING AND DISCHARGING PLAN | | UP DR COMMAND ▽ UP DR |

- POWER TRANSACTION PRICE
- ELECTRICITY BILL

HIGH △ LOW ▽

TIME (a)

POWER DEMAND

POWER CRUNCH

POWER SURPLUS (b)

SOC

ENTER GARAGE ▽

LEAVE GARAGE ▽

DISCHARGE

CHARGE

0

TIME (CONT.)

(FIG. 3 CONTINUED)
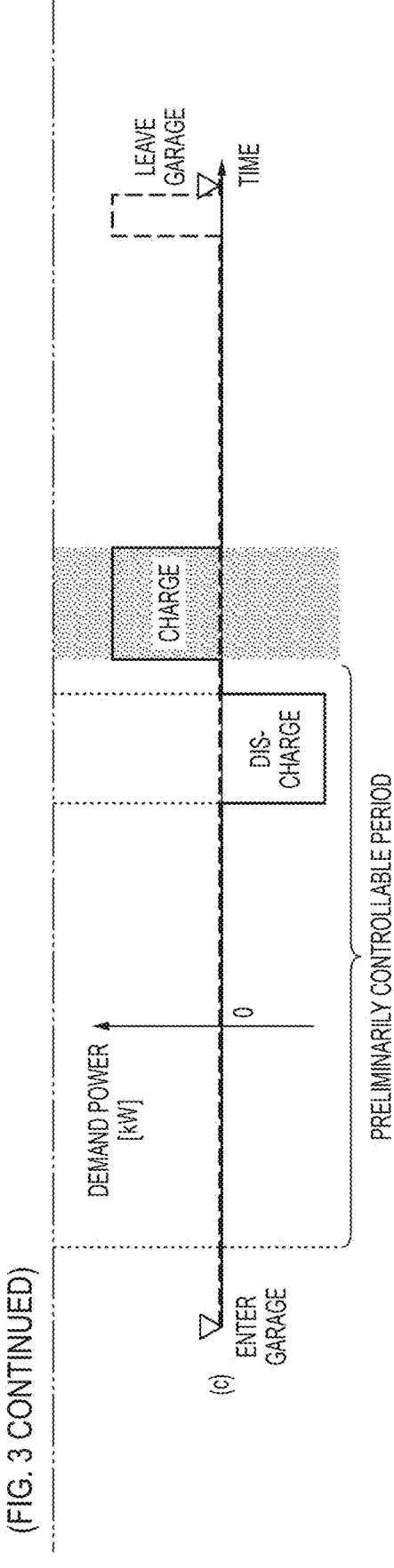

(CONT.)

(FIG. 4 CONTINUED)
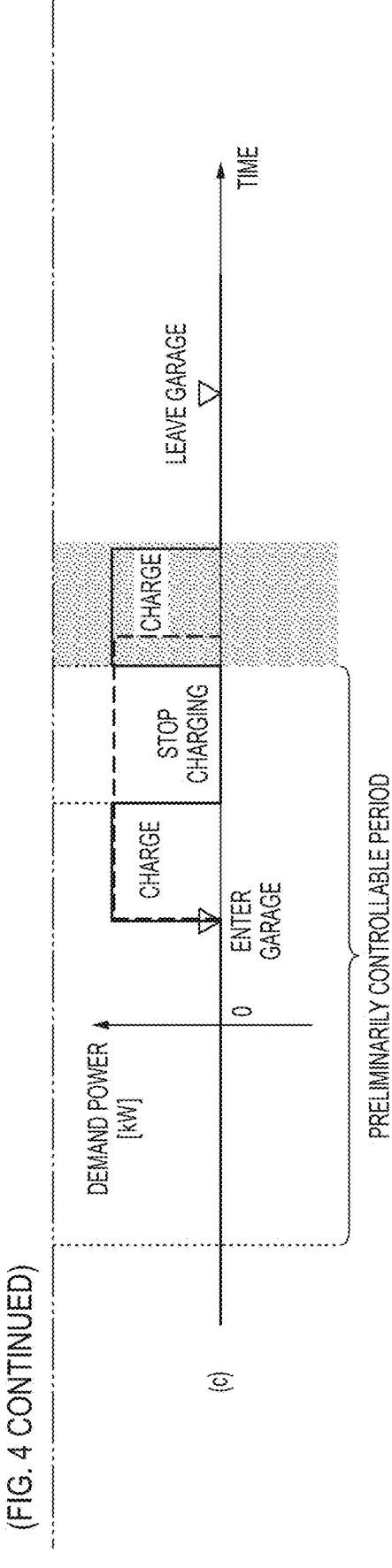

(CONT.)

(FIG. 5 CONTINUED)
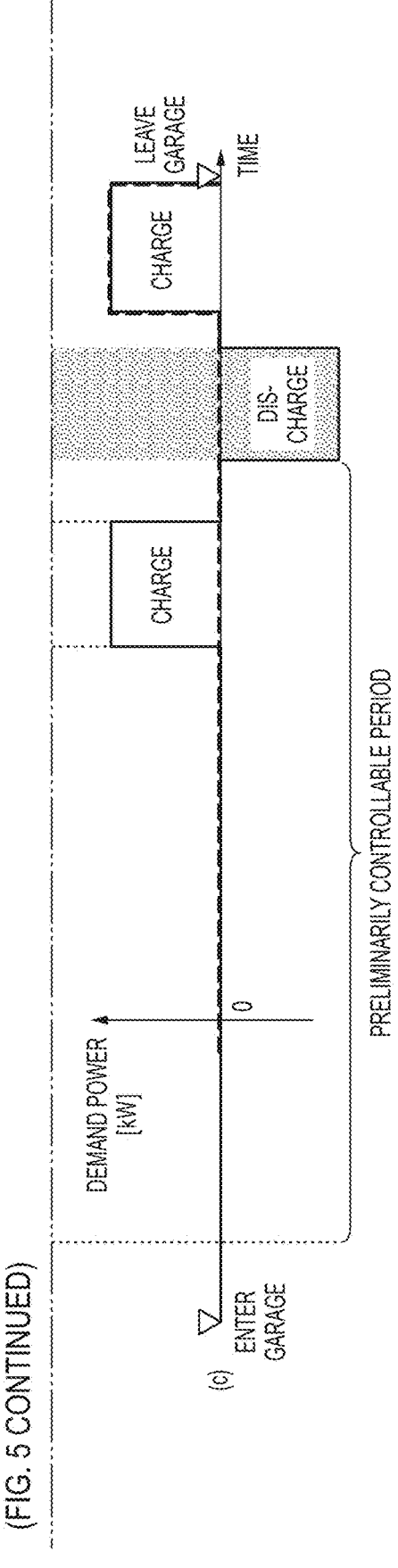

(CONT.)

(FIG. 6 CONTINUED)
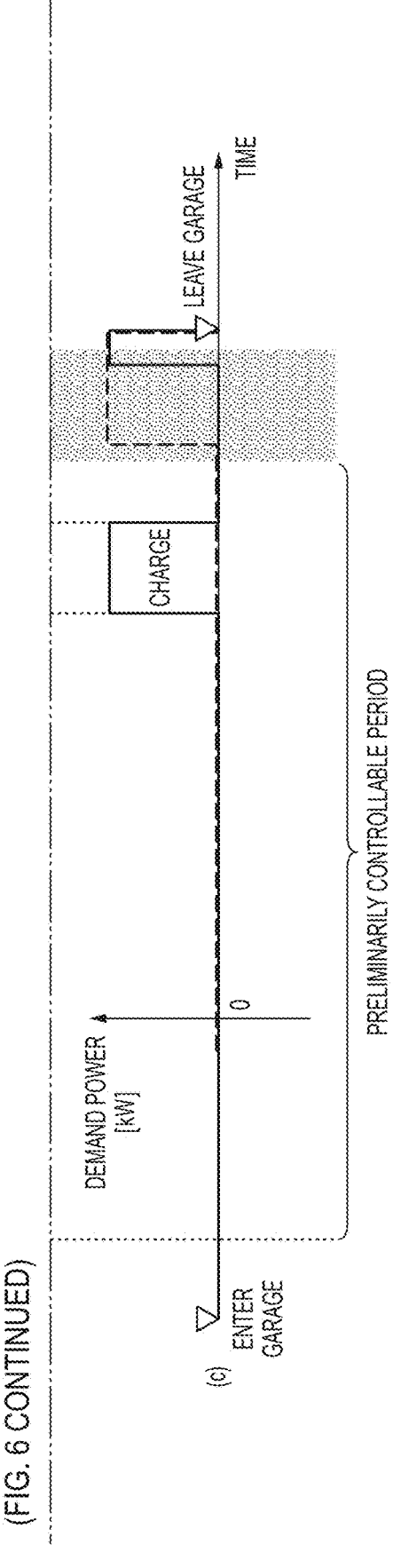

(FIG. 7 CONTINUED)
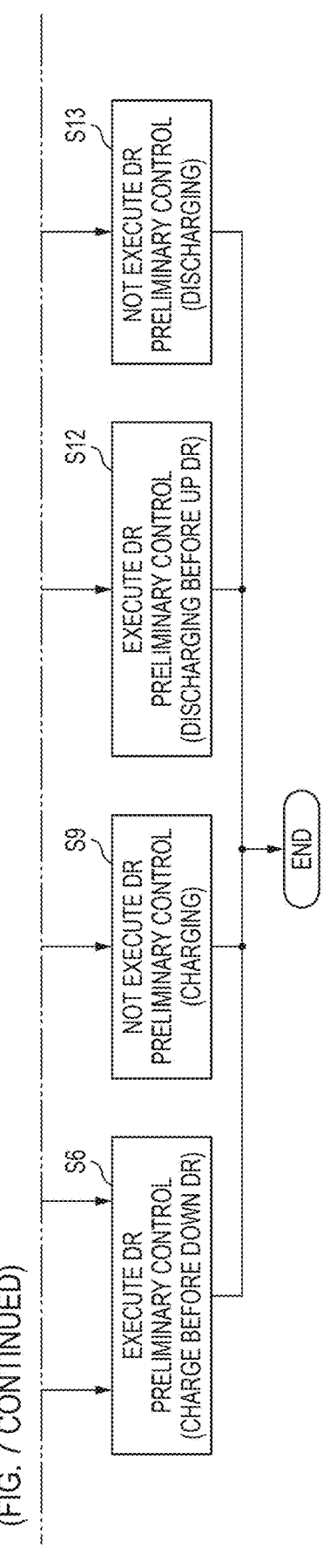
S6 EXECUTE DR PRELIMINARY CONTROL (CHARGE BEFORE DOWN DR)
S9 NOT EXECUTE DR PRELIMINARY CONTROL (CHARGING)
S12 EXECUTE DR PRELIMINARY CONTROL (DISCHARGING BEFORE UP DR)
S13 NOT EXECUTE DR PRELIMINARY CONTROL (DISCHARGING)
END

CONTROL DEVICE

This application is based upon and claims the benefit of priority from prior Japanese patent application No. 2023-220638, filed on Dec. 27, 2023, the entire contents of which are incorporated herein by reference.

TECHNICAL FIELD

The present disclosure relates to a control device that controls charging and discharging of a plurality of charging systems.

BACKGROUND ART

In recent years, researches and developments have been conducted on a secondary battery which contributes to improvement in energy efficiency in order to allow more people to have access to affordable, reliable, sustainable and advanced energy.

In power systems in recent years, it is expected to utilize distributed power sources such as power generation facilities and power storage batteries without depending on large-scale centralized power supplies such as power plants. A vehicle including a driving battery is expected to be one of the distributed power supplies.

JP6913114B discloses a power transmission and reception system that transmits power between a battery mounted on a vehicle and a power grid.

SUMMARY

In a related-art technique such as being disclosed in JP6913114B, there is a room for consideration in terms of devising ways to make maximum use of an energy storage function of a battery.

Aspects of the present disclosure relates to providing a control device capable of increasing a power resource that can be supplied to a power grid during an execution period of the DR.

According to an aspect of the present disclosure, there is provided a control device for controlling charging and discharging of a plurality of power storage systems each of which is capable of being charged by a power grid and discharging power to the power grid, the control device including:

an acquisition unit configured to acquire an intention to participate in a demand response (DR) for adjusting a power supply and demand balance in the power grid from a plurality of consumers respectively holding or using the plurality of power storage systems when the DR is contracted in a power transaction;

a resource ensuring unit configured to ensure, from the power storage systems of the plurality of consumers indicating the intention, a power resource that the power storage systems are able to supply to the power grid during an execution period of the DR;

a charging and discharging plan formulating unit configured to adjust a charging state of each of the power storage systems during a preliminarily controllable period that is a predetermined period before a start of the DR and formulate a charging and discharging plan for increasing the power resource that is able to be supplied during the execution period of the DR; and a communication unit configured to transmit the charging and discharging plan formulated by the charging and discharging plan formulating unit to the power storage system.

According to an aspect of the present disclosure, since preliminary control for adjusting the charging state of the power storage system is performed before the start of the DR, it is possible to increase the power resource that can be supplied to the power grid during the execution period of the DR.

BRIEF DESCRIPTION OF DRAWINGS

Exemplary embodiment(s) of the present invention will be described in detail based on the following figures, wherein.

DESCRIPTION OF EMBODIMENTS

Hereinafter, a control device according to an embodiment of the present disclosure will be described with reference to the accompanying drawings.

Figure 1:
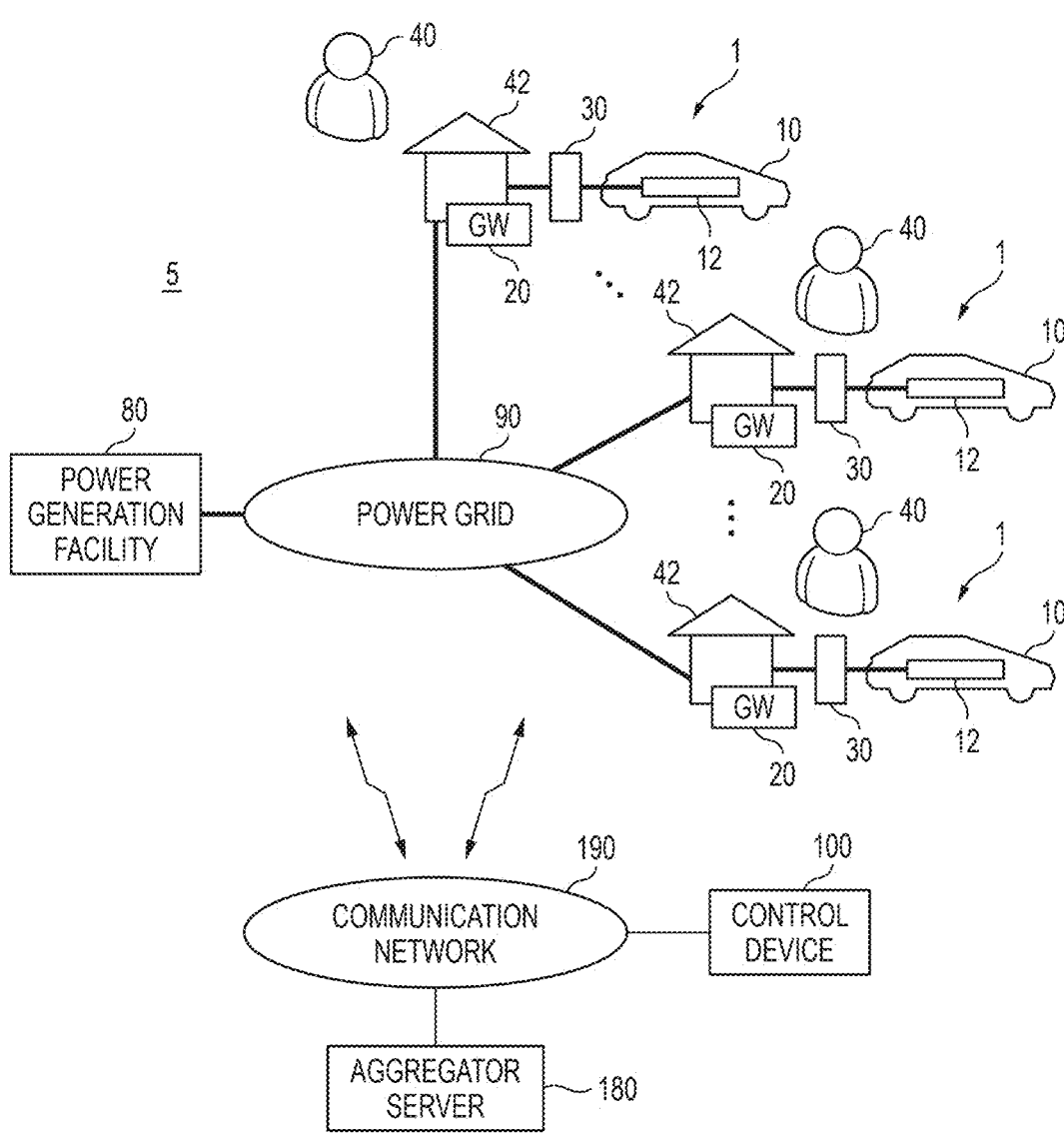
FIG. 1 is a diagram conceptually showing a use form of a system 5 according to an embodiment of the present disclosure.

FIG. 1 conceptually shows a use form of a system 5 according to the embodiment. The system 5 includes power storage systems 1 respectively owned or used by a plurality of consumers 40, a power generation device 80, a control device 100, and an aggregator server 180.

Each of the power storage systems 1 includes a vehicle 10, a gateway (GW) 20, and a charging and discharging facility 30. Each vehicle 10 includes a battery 12 that is a power storage device. The vehicle 10 is, for example, an electric automobile or a plug-in hybrid vehicle. The battery 12 is a battery that supplies electric power for traveling of the vehicle 10. The vehicle 10 may be a vehicle owned by an individual, a vehicle used by a business operator for business, a share car, or the like.

The control device 100 is connected to the aggregator server 180 via a communication network 190. The control device 100 can communicate with the charging and discharging facility 30 via the communication network 190. The control device 100 controls the charging and discharging facility 30 via the communication network 190. The control device 100 communicates with the vehicle 10 via the communication network 190 to acquire various types of information of the vehicle 10 including a travel history of the vehicle 10, a state of charge (SOC) and a state of health (SOH) of the battery 12.

The gateway 20 is installed in a dwelling unit 42 and can communicate with a power grid 90 and the charging and discharging facility 30.

The charging and discharging facility 30 and the power generation device 80 are connected to the power grid 90. The power generation device 80 includes, for example, a power plant operated by a power company. Electric power generated by the power generation device 80 may be supplied to the charging and discharging facility 30 through the power grid 90. The power grid 90 is, for example, a power system.

The charging and discharging facility 30 charges and discharges the battery 12 mounted on the vehicle 10 connected to the charging and discharging facility 30. The charging and discharging facility 30 is installed in the dwelling unit 42 and charges and discharges the battery 12 mounted on the vehicle 10 connected to the charging and discharging facility 30. When the charging and discharging facility 30 discharges the battery 12, electric power provided from the battery 12 may be consumed by a power load in the dwelling unit 42 or may be provided to the power grid 90 through a power line installed in the dwelling unit 42. Further, the charging and discharging facility 30 may charge the battery 12 with electric power received from the power grid 90.

When electric power is transmitted and received between the power grid 90 and the battery 12, the vehicle 10 and the charging and discharging facility 30 charge and discharge the battery 12 according to control of the control device 100. For example, when power shortage occurs in the power grid 90, the control device 100 may transmit electric power from the battery 12 to the power grid 90 by instructing the vehicle 10 and the charging and discharging facility 30 to discharge the battery 12 via the gateway 20. When a power surplus occurs in the power grid 90, the control device 100 can reduce the power surplus of the power grid 90 by instructing the vehicle 10 and the charging and discharging facility 30 to charge the battery 12 via the gateway 20. In this way, the control device 100 may integrate the plurality of batteries 12 mounted on the plurality of vehicles 10 to provide a power resource for the power grid 90.

The aggregator server 180 is, for example, a server used by a power aggregator. The aggregator server 180 performs power transactions in a power market or the like. The control device 100 communicates with the aggregator server 180 to provide a necessary amount of power from the battery 12 to the power grid 90, or to receive a necessary amount of power for (that is, charge) the battery 12 from the power grid 90. For example, in response to a request from the aggregator server 180, the control device 100 controls the vehicle 10 and the charging and discharging facility 30 to discharge the battery 12, and provides electric power of an amount corresponding to the request to the power grid 90. Further, in response to a request from the aggregator server 180, the control device 100 may control the vehicle 10 and the charging and discharging facility 30 to charge the battery 12, and receive electric power of an amount corresponding to the request from the power grid 90. As described above, the vehicle 10 on which the battery 12 is mounted may appropriately control an amount of electric power by charging and discharging the battery 12.

Figure 2:
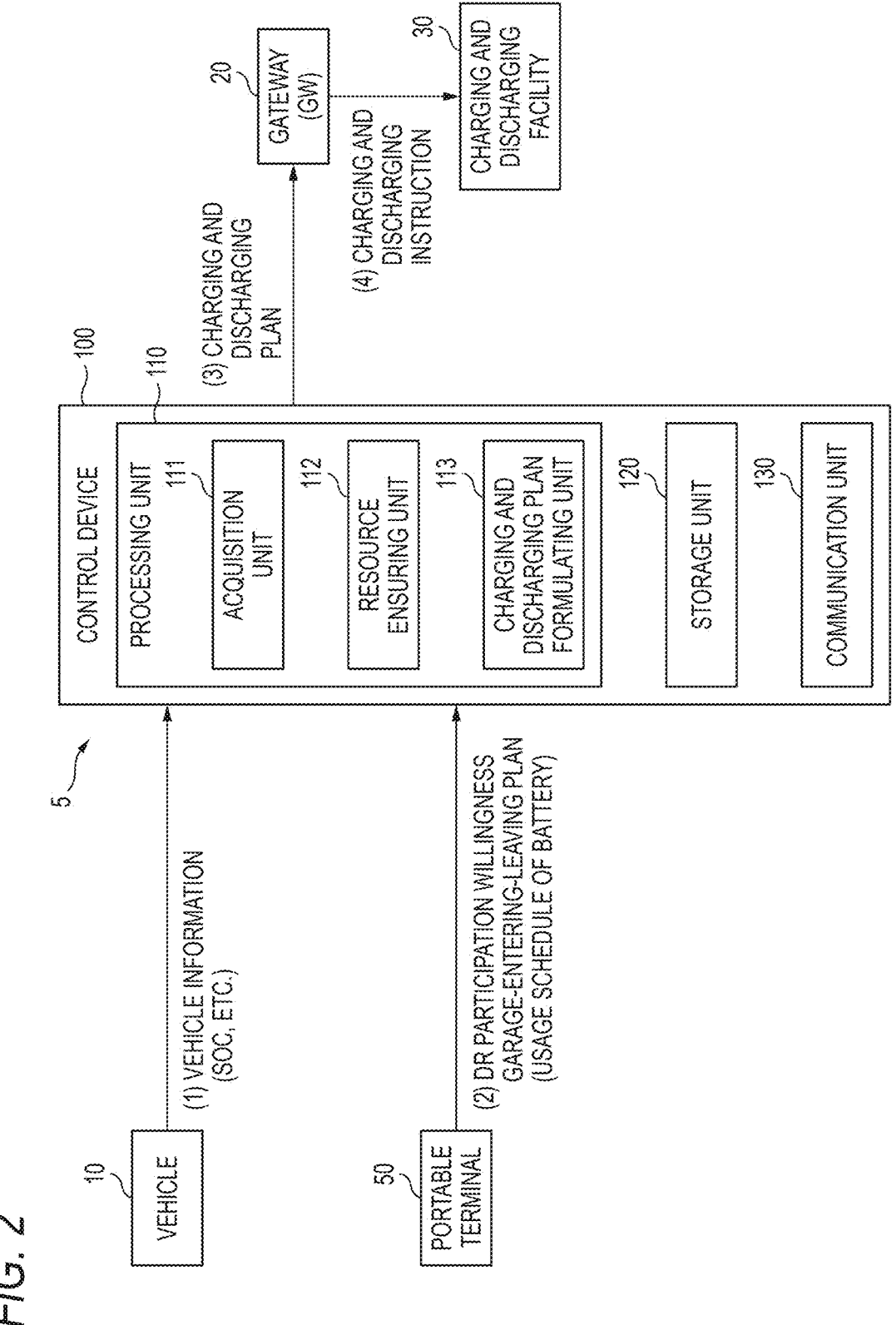
FIG. 2 is a block diagram of a control device 100 and a diagram showing a relationship between the control device 100 and other devices.

FIG. 2 is a block diagram of the control device 100 and a diagram showing a relationship between the control device 100 and other devices. The control device 100 is a device that controls charging and discharging of the plurality of power storage systems 1 capable of charging and discharging power between the power storage systems 1 and the power grid 90.

The relationship between the control device 100 and other devices will be described. (1) The vehicle 10 transmits vehicle information including the travel history, the SOC, and the like to the control device 100. (2) The consumer 40 operates a predetermined application in a portable terminal 50 to input DR participation willingness related to whether to participate in a demand response (DR) for adjusting a power supply and demand balance in the power grid 90, a garage-entering-leaving plan related to a schedule for the vehicle 10 to enter and leave a garage, and the like. The portable terminal 50 transmits the received DR participation willingness, the garage-entering-leaving plan, and the like to the control device 100.

(3) The control device 100 transmits a created charging and discharging plan to the gateway 20. (4) The gateway 20 issues a charging and discharging instruction to the charging and discharging facility 30. The creation of the charging and discharging plan by the control device 100 will be described later.

The control device 100 includes a processing unit 110, a storage unit 120, and a communication unit 130. The processing unit 110 is implemented by an arithmetic processing unit including a processor, and performs main processing of the control device 100. The processing unit 110 may be implemented by a microcomputer including a CPU, a ROM, a RAM, an I/O, a bus, and the like. The control device 100 may be implemented by a computer. The storage unit 120 includes, for example, a non-volatile storage medium, and stores various data, programs, and the like. The processing unit 110 reads a program stored in the storage unit 120 to perform predetermined processing, for example. The communication unit 130 realizes communication with an external device.

The processing unit 110 includes an acquisition unit 111, a resource ensuring unit 112, and a charging and discharging plan formulating unit 113. In a case where the aggregator server 180 used by the power aggregator makes a contract in a power transaction for the DR, the acquisition unit 111 acquires an intention to participate in the DR from the plurality of consumers 40 holding or using the plurality of power storage systems 1, that is, the DR participation willingness in (2).

The resource ensuring unit 112 ensures a power resource that the power storage system 1 may supply to the power grid 90 during a DR execution period from among the power storage systems 1 of the consumers 40 indicating the intention. The power resource that may be supplied herein is a concept that includes both charging and discharging of the battery 12. Further, in a case of a negawatt transaction, the power resource that may be supplied includes a power resource that does not participate in the power transaction such as a stop of a charging schedule of the battery 12.

The DR includes an up DR and a down DR. During an execution period of the up DR, a charging amount of the battery 12 is increased, or scheduled discharging of the battery 12 is stopped to reduce a discharging amount. Further, during an execution period of the down DR, the discharging amount of the battery 12 is increased or scheduled charging of the battery 12 is stopped to reduce the charging amount. During the execution periods of the up DR and the down DR, the battery 12 may be controlled in four ways, and is controlled according to various situations. Details of the up DR and the down DR will be described later.

The charging and discharging plan formulating unit 113 adjusts a charging state of the power storage system 1 during a preliminarily controllable period which is a predetermined period before a start of the DR, and formulates a charging and discharging plan for increasing the power resource that may be supplied during the DR execution period. The charging and discharging plan formulating unit 113 increases the power resource ensured by the resource ensuring unit 112. The preliminarily controllable period will be described later.

The communication unit 130 transmits the charging and discharging plan created by the charging and discharging plan formulating unit 113, as shown in (3), to the power storage system 1.

Figure 3:
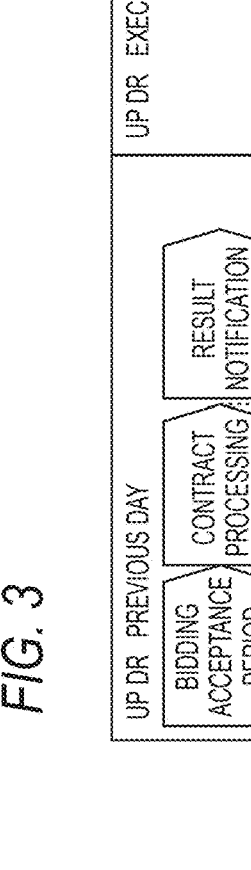
FIG. 3 is a timing chart of a plan for the control device 100 to discharge a battery 12 during a preliminarily controllable period before a start of an up DR.

FIG. 3 is a timing chart of a plan for the control device 100 to discharge the battery 12 during the preliminarily controllable period before a start of the up DR, in which (a) of FIG. 3 is a power demand prediction in the power grid 90, (b) of FIG. 3 is the SOC of the battery 12, and (c) of FIG. 3 is demand power [KW] of the power storage system 1. In FIG. 3, it is assumed that processing from bidding to contracting for the DR is performed as a preliminary preparation of the DR on a previous day of a DR execution day, and the same also applies to FIGS. 4 to 6 to be described later. Further, the preliminarily controllable period in this example is a period from the contracting of the DR to a start of the DR which allows the preliminary preparation of the DR, and the same also applies to FIGS. 4 to 6.

The power aggregator starts a power transaction in a power transaction market or the like on the previous day of the DR execution day, and performs bidding in a bidding acceptance period. After contract processing, a contract result is notified. After the contracting, the acquisition unit 111 acquires the intention to participate in the DR from the plurality of consumers 40, that is, the DR participation willingness in (2). Then, the charging and discharging plan formulating unit 113 formulates the charging and discharging plan for the power storage system 1 of the consumer 40 who has declared the participation intention.

The control device 100 performs preliminary control for adjusting the SOC of the battery 12 before the start of the DR, based on the formulation of the charging and discharging plan by the charging and discharging plan formulating unit 113. Thus, the power resource that can be supplied to the power grid 90 during the DR execution period may be increased. This will be described in detail below with reference to FIGS. 3 to 6.

(a) of FIG. 3 shows that as a power demand increases, the power becomes tight, a power transaction price, an electricity bill, and the like are increased, conversely, as the power demand decreases, the power becomes surplus, the power transaction price, the electricity bill, and the like are lowered, and the same also applies to FIGS. 4 to 6 to be described later. As shown in (a) of FIG. 3, since power surplus in the power grid 90 is predicted to occur on the DR execution day, the up DR for requesting an increase in the power demand in the power storage system 1 is performed.

(b) of FIG. 3 and (c) of FIG. 3 specifically and respectively show the SOC and the demand power in the charging and discharging plan (solid line) for the power storage system 1 of the consumer 40 formulated by the charging and discharging plan formulating unit 113. A broken line in the figure indicates the SOC and the demand power assumed based on the garage-entering-leaving plan if there is no up DR.

In this example, the vehicle 10 enters the garage from the previous day. The charging and discharging plan formulating unit 113 adjusts the SOC of the battery 12 of the power storage system 1 during the preliminarily controllable period and immediately before issuance of an up DR command.

Specifically, the charging and discharging plan formulating unit 113 formulates a plan for discharging the battery 12. At this time, since power is supplied to the power grid 90, the demand power of the power storage system 1 becomes negative. The charging and discharging plan formulating unit 113 formulates a plan for charging the battery 12 during the execution period of the up DR. At this time, since the battery 12 is charged with power received from the power grid 90, the demand power of the power storage system 1 becomes positive, and power surplus in the power grid 90 may be handled.

As in the this example, when the DR is an up DR for requesting an increase in the power demand, it is possible to increase the power resource that may be supplied to the power grid 90 during the execution period of the up DR, by discharging the power storage system 1 before execution of the up DR and charging the power storage system 1 during the execution period of the up DR by an amount discharged before the execution of the up DR. The power resource that can be supplied here is a power resource that increases a chargeable potential of the battery 12 during the execution period of the up DR.

Figure 4:
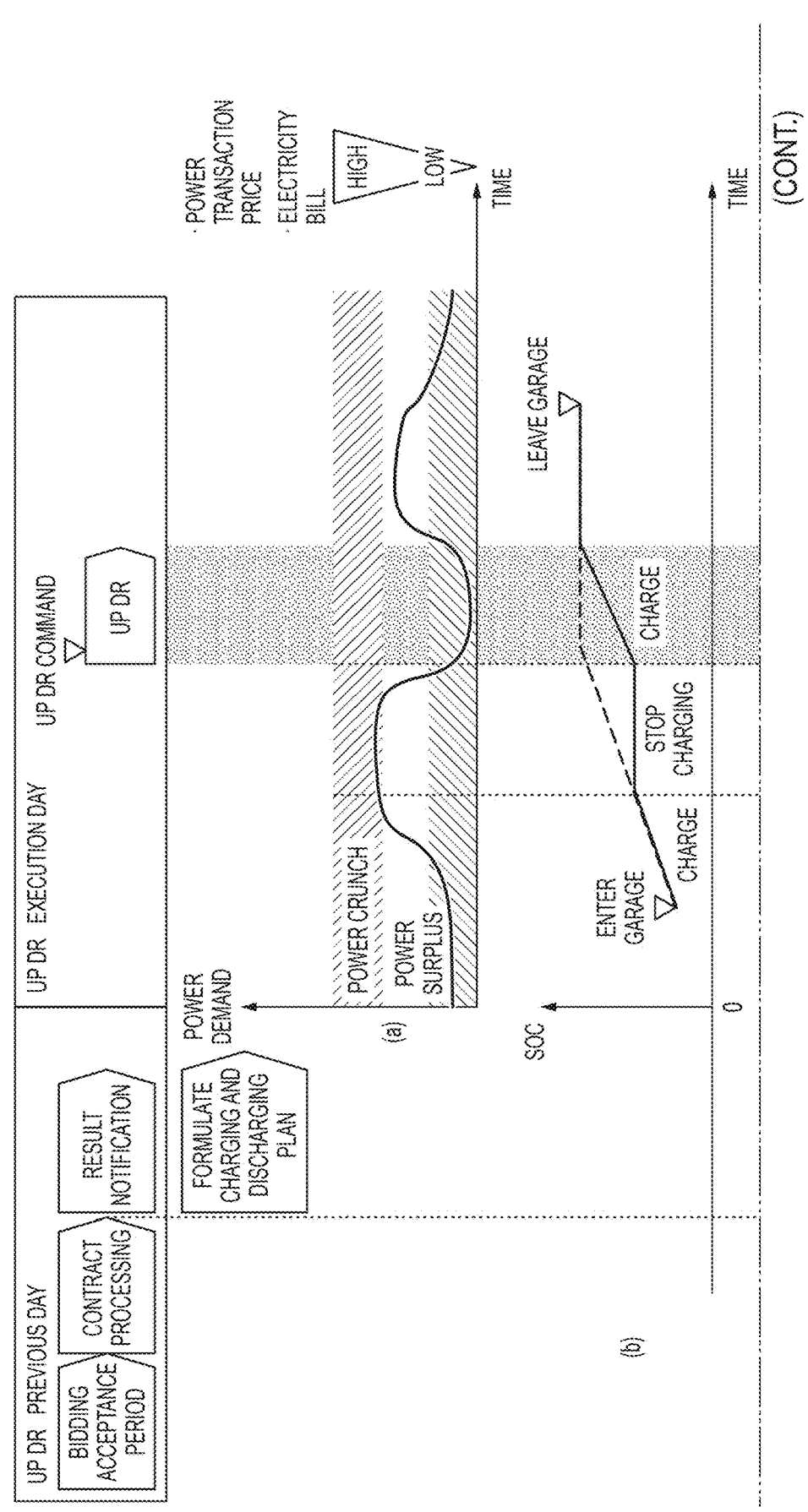
FIG. 4 is a timing chart of a plan for the control device 100 to stop charging of the battery 12 during the preliminarily controllable period before the start of the up DR.

FIG. 4 is a timing chart of a plan for the control device 100 to stop the charging of the battery 12 during the preliminarily controllable period before the start of the up DR, (a) of FIG. 4 shows a power demand prediction in the power grid 90, and (b) of FIG. 4 and (c) of FIG. 4 specifically and respectively show the SOC and the demand power in the charging and discharging plan (solid line) for the power storage system 1 of the consumer 40 formulated by the charging and discharging plan formulating unit 113.

In this example, the battery 12 is charged immediately after the vehicle 10 enters the garage. The charging and discharging plan formulating unit 113 adjusts the SOC of the battery 12 of the power storage system 1 during the preliminarily controllable period and immediately before the issuance of the up DR command. Specifically, the charging and discharging plan formulating unit 113 formulates a plan for stopping the charging of the battery 12. At this time, the demand power of the power storage system 1 is zero. As indicated by the broken line, in a case where the charging of the battery 12 is not stopped, the SOC of the battery 12 may reach a sufficient amount during the preliminarily controllable period and the charging cannot be further performed during the execution period of the up DR. In this example, since the charging of the battery 12 is stopped during the preliminarily controllable period, it is possible to increase the power resource that may be supplied to the power grid 90 during the execution period of the up DR by charging the battery 12 during the execution period of the up DR by an amount that is not charged before the execution of the up DR. The power resource that may be supplied here is a concept that includes both charging and discharging of the battery 12, and is a power resource that increases a chargeable potential of the battery 12 during the execution period of the up DR.

The charging stop (FIG. 4) or the discharging (FIG. 3) of the power storage system 1 during the preliminarily controllable period is preferably executed when power crunch occurs in the power grid 90 during the preliminarily controllable period, as shown in (a) of FIG. 3 and (a) of FIG. 4. Thus, the charging stop or the discharging of the power storage system 1 can contribute to alleviating the power crunch during the preliminarily controllable period.

Figure 5:
FIG. 5 is a timing chart (a first part) of a plan for the control device 100 to charge the battery 12 during the preliminarily controllable period before a start of a down DR.

FIG. 5 is a timing chart (a first part) of a plan for the control device 100 to charge the battery 12 during the preliminarily controllable period before a start of the down DR, (a) of FIG. 5 is a power demand prediction in the power grid 90, (b) of FIG. 5 is the SOC of the battery 12, and (c) of FIG. 5 is the demand power of the power storage system 1. As shown in (a) of FIG. 5, since power crunch in the power grid 90 is predicted to occur on the DR execution day, the down DR for requesting a decrease of the power demand in the power storage system 1 is performed.

(b) of FIG. 5 and (c) of FIG. 5 specifically and respectively show the SOC and the demand power in the charging and discharging plan (solid line) for the power storage system 1 of the consumer 40 formulated by the charging and discharging plan formulating unit 113. A broken line in the figure indicates the SOC and the demand power assumed based on the garage-entering-leaving plan if there is no down DR.

In this example, the vehicle 10 enters the garage from the previous day. The charging and discharging plan formulating unit 113 adjusts the SOC of the battery 12 of the power storage system 1 during the preliminarily controllable period and immediately before issuance of a down DR command. Specifically, the charging and discharging plan formulating unit 113 formulates a plan for charging the battery 12. At this time, since the battery 12 is charged with power received from the power grid 90, the demand power of the power storage system 1 becomes positive. The charging and discharging plan formulating unit 113 formulates a plan for discharging the battery 12 during the execution period of the down DR. At this time, since the power is supplied to the power grid 90, the demand power of the power storage system 1 becomes negative, and the power crunch in the power grid 90 may be handled.

As indicated by the broken line, in a case where the battery 12 is not charged during the preliminarily controllable period, the discharging may not be able to be performed during the execution period of the down DR. In this example, since the battery 12 is charged during the preliminarily controllable period, it is possible to increase the power resource that may be supplied to the power grid 90 during the execution period of the down DR by storing power, that is to be discharged during the execution period of the down DR, in the battery 12. The power resource that may be supplied here is a power resource that increases a dischargeable potential of the battery 12 during the execution period of the down DR.

Figure 6:
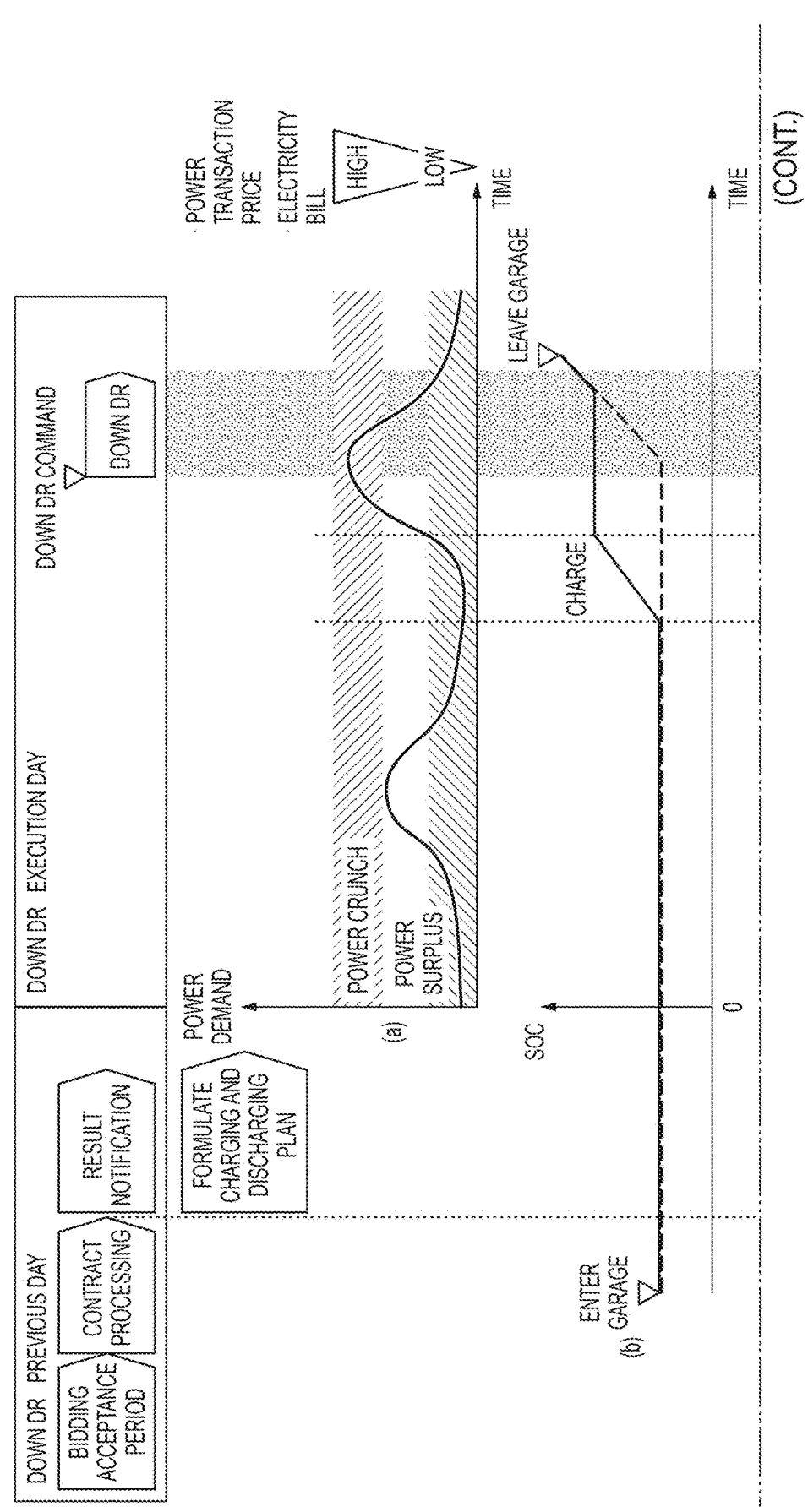
FIG. 6 is a timing chart (a second part) of a plan for the control device 100 to charge the battery 12 during the preliminarily controllable period before the start of the down DR.

FIG. 6 is a timing chart (a second part) of a plan for the control device 100 to charge the power storage system 1 during the preliminarily controllable period before the start of the down DR, (a) of FIG. 6 is a power demand prediction in the power grid 90, (b) of FIG. 6 is the SOC of the battery 12 of the power storage system 1, and (c) of FIG. 6 is the demand power of the power storage system 1.

In this example, the charging and discharging plan formulating unit 113 also adjusts the SOC of the battery 12 of the power storage system 1 during the preliminarily controllable period and immediately before the issuance of the down DR command. Specifically, the charging and discharging plan formulating unit 113 formulates a plan for charging the battery 12. At this time, since the battery 12 is charged with power received from the power grid 90, the demand power of the power storage system 1 becomes positive.

A broken line in the figure indicates the SOC and the demand power assumed based on the garage-entering-leaving plan if there is no down DR, and the battery 12 is predicted to be charged during the execution period of the down DR before the charging and discharging plan is formulated. In the example of FIG. 5, the charging and discharging plan formulating unit 113 plans a plan for discharging the battery 12 during the execution period of the down DR, but as shown in (b) of FIG. 6, a plan in which the battery 12 is not discharged during the execution period of the down DR may be formulated. The plan in which the battery 12 is not discharged during the execution period of the down DR is formulated, but it is predicted that the battery 12 is charged during the execution period of the down DR and the demand power is increased as indicated by the broken line at the beginning, so that the demand power during the execution period of the down DR is reduced as compared with that before the charging and discharging plan is formulated, and the power crunch in the power grid 90 may be handled.

In this way, it is possible to increase the power resource that may be supplied to the power grid 90 during the execution period of the down DR by charging the battery 12 before the execution of the down DR and reducing a charging amount during the execution period of the down DR. The power resource that may be supplied here is a power resource that increases a dischargeable potential of the battery 12 during the execution period of the down DR.

The charging of the battery 12 during the preliminarily controllable period is preferably executed when there is surplus power in the power grid 90 during the preliminarily controllable period, as shown in (a) of FIG. 5 and (a) of FIG. 6. Thus, the surplus power during the preliminarily controllable period may be effectively used.

Figure 7:
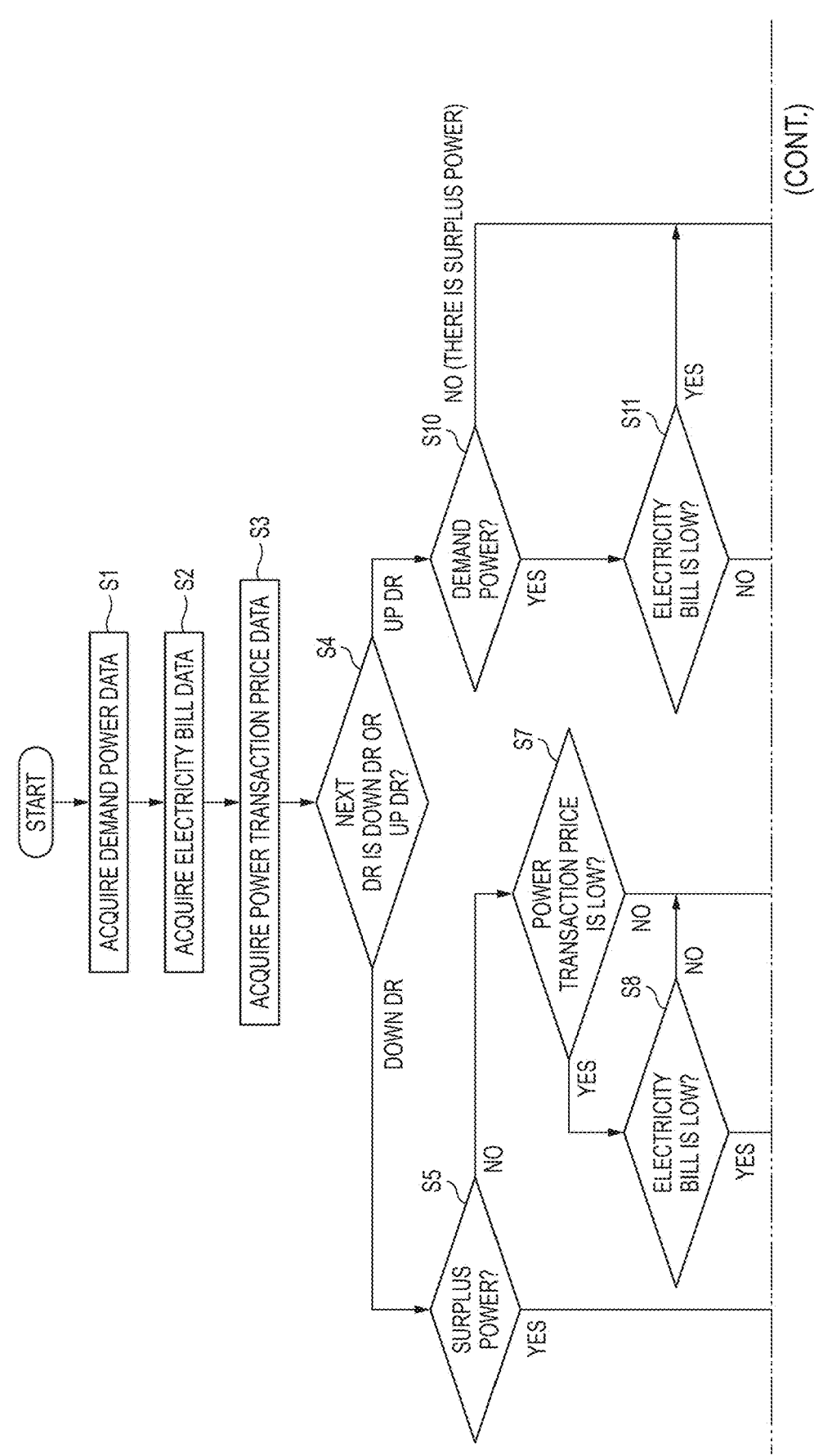
FIG. 7 is a flowchart showing a procedure of charging and discharging control of the power storage system 1 executed by the control device 100.

FIG. 7 is a flowchart showing a procedure of charging and discharging control of the power storage system 1 executed by the control device 100. The control device 100 acquires demand power data as shown in (a) of FIG. 3 to (a) of FIG. 6 (step S1) and acquires electricity bill data (step S2). Further, the control device 100 acquires power transaction price data (step S3).

Based on information of the aggregator server 180, the control device 100 determines whether a next DR to be executed next is the down DR or the up DR (step S4). When it is determined that the next DR is the down DR, the control device 100 determines whether there is surplus power in the power grid 90 during the preliminarily controllable period (step S5). When there is surplus power during the preliminarily controllable period (step S5; YES), the control device 100 executes DR preliminary control and charges the battery 12 before the down DR (step S6).

On the other hand, when it is determined that there is no surplus power in the power grid 90 during the preliminarily controllable period (step S5; NO), the control device 100 determines whether the power transaction price is low (step S7), when the power transaction price is low (step S7; YES), it is further determined whether the electricity bill is low (step S8). When the electricity bill is also low (step S8; YES), the charging of the battery 12 may be performed at a low cost, and thus the control device 100 executes the DR preliminary control and charges the battery 12 before the down DR (step S6).

When it is determined in step S7 that the power transaction price is not low (step S7; NO), or when it is determined that the electricity bill is not low (step S8; NO), the charging of the battery 12 is costly, and thus the control device 100 does not execute the DR preliminary control (charging) (step S9).

On the other hand, when it is determined in step S4 that the next DR is the up DR, the control device 100 determines whether there is demand power in the power grid 90 (step S10). When there is demand power (step S10; YES), that is, when there is no surplus power, the control device 100 determines whether the electricity bill is low (step S11). When the electricity bill is not low (step S11; NO), since the power may be sold at a high price, the control device 100 executes the DR preliminary control and discharges the battery 12 before the up DR (step S12).

When there is no demand power in step S10 (step S10; NO), or when the electricity bill is low (step S11; YES), since there is surplus power, or the power may be sold at a low price, the control device 100 does not execute the DR preliminary control (discharging) (step S13).

In the examples of FIGS. 3 to 6, the preliminarily controllable period is a period from the contracting of the DR to the start of the DR. However, the preliminarily controllable period may be a period from the bidding of the DR to the start of the DR. Thus, since a period after the bidding or contracting of the DR may be set as the preliminarily controllable period, the preliminarily controllable period may be sufficiently ensured.

Further, during a period immediately before the start of the DR (for example, two hours before the start of the DR), it may be determined that a deviation occurs between the power resource ensured by the resource ensuring unit 112 and the power demand requested by the DR. For example, in a case of the up DR (FIGS. 3 and 4), the power storage system 1 for charging is not sufficient, and in a case of the down DR (FIGS. 5 and 6), the power storage system 1 for discharging is not sufficient. In this case, the charging and discharging plan formulating unit 113 can adjust the SOC of the battery 12 during the period immediately before the start of the DR, and formulate a charging and discharging plan for increasing the power resource that may be supplied during the DR execution period.

Thus, for example, when it is determined immediately before the start of the DR that the power resource cannot be sufficiently ensured due to a usage status of the power storage system 1 according to the consumer, it is possible to prevent occurrence of power resource shortage during the DR execution period.

Although the embodiment has been described above with reference to the drawings, it is needless to say that the present invention is not limited to these examples. It is apparent that those skilled in the art can conceive of various modifications and alterations within the scope described in the claims, and it is understood that such modifications and alterations naturally fall within the technical scope of the present invention. In addition, respective constituent elements in the above-described embodiment may be freely combined without departing from the gist of the invention.

For example, the power transaction may be performed via the power transaction market as described above, or may be performed directly with a power company by using a schedule coordinator and an aggregator.

In this specification, at least the following matters are described. Although corresponding constituent elements or the like in the embodiment described above are shown in parentheses, the present invention is not limited thereto.

(1) A control device (control device 100) for controlling charging and discharging of a plurality of power storage systems (power storage system 1) each of which is capable of being charged by a power grid (power grid 90) and discharging power to the power grid, the control device including:

an acquisition unit (acquisition unit 111) configured to acquire an intention to participate in a demand response (DR) for adjusting a power supply and demand balance in the power grid from a plurality of consumers respectively holding or using the plurality of power storage systems when the DR is contracted in a power transaction;

a resource ensuring unit (resource ensuring unit 112) configured to ensure, among the power storage systems of the plurality of consumers indicating the participation intention, a power resource that the power storage systems are able to supply to the power grid during an execution period of the DR;

a charging and discharging plan formulating unit (charging and discharging plan formulating unit 113) configured to adjust a charging state (SOC of battery 12) of each of the power storage systems during a preliminarily controllable period that is a predetermined period before a start of the DR and formulate a charging and discharging plan for increasing the power resource that is able to be supplied during the execution period of the DR; and a communication unit (communication unit 130) configured to transmit the charging and discharging plan formulated by the charging and discharging plan formulating unit to the power storage system.

According to (1), since preliminary control for adjusting the charging state of the power storage system is performed before the start of the DR, it is possible to increase the power resource that can be supplied to the power grid during the execution period of the DR.

(2) The control device according to (1), in which the DR is an up DR for requesting an increase in power demand, and the charging and discharging plan includes a plan for stopping charging of the power storage system during the preliminarily controllable period or a plan for discharging the power storage system during the preliminarily controllable period.

According to (2), it is possible to increase the power resource that can be supplied to the power grid during the execution period of the up DR, by discharging or stopping charging the power storage system before execution of the up DR and charging the power storage system during the execution period of the up DR by an amount that is discharged or an amount that is not charged before the execution of the up DR.

(3) The control device according to (2), in which the charging stop or the discharging of the power storage system during the preliminarily controllable period is executed when power crunch occurs in the power grid during the preliminarily controllable period.

According to (3), the charging stop or the discharging of the power storage system may contribute to alleviating the power crunch during the preliminarily controllable period.

(4) The control device according to (1), in which the DR is a down DR for requesting a decrease in power demand, and the charging and discharging plan includes a plan for charging the power storage system during the preliminarily controllable period.

According to (4), it is possible to increase the power resource that may be supplied to the power grid during the execution period of the down DR, by charging the power storage system before execution of the down DR and discharging the power storage system during the execution period of the down DR, or by reducing a charging amount during the execution period of the down DR.

(5) The control device according to (4), in which the charging of the power storage system during the preliminarily controllable period is executed when there is surplus power in the power grid during the preliminarily controllable period.

According to (5), the surplus power during the preliminarily controllable period may be effectively used.

(6) The control device according to any one of (1) to (5), in which the preliminarily controllable period is a period from bidding of the DR to the start of the DR, or a period from contracting of the DR to the start of the DR.

According to (6), since the preliminarily controllable period may be set after the bidding or contracting of the DR, the preliminarily controllable period may be sufficiently ensured.

(7) The control device according to any one of (1) to (6), in which when it is determined that a deviation occurs between the power resource ensured by the resource ensuring unit and a power demand requested by the DR during a period immediately before the start of the DR, the charging and discharging plan formulating unit adjusts the charging state of the power storage system during the period immediately before the start of the DR, and formulates the charging and discharging plan for increasing the power resource that is able to be supplied during the execution period of the DR.

According to (7), for example, when it is determined immediately before the start of the DR that the power resource cannot be sufficiently ensured due to a usage status of the power storage system according to the consumer, it is possible to prevent occurrence of power resource shortage during the execution period of the DR.

What is claimed is:

1. A control device for controlling charging and discharging of a plurality of power storage systems each of which is capable of being charged by a power grid and discharging power to the power grid, the control device comprising:

an acquisition unit configured to acquire an intention to participate in a demand response (DR) for adjusting a power supply and demand balance in the power grid from a plurality of consumers respectively holding or using the plurality of power storage systems when the DR is contracted in a power transaction;

a resource ensuring unit configured to ensure, from the power storage systems of the plurality of consumers indicating the intention, a power resource that the power storage systems are able to supply to the power grid during an execution period of the DR;

a charging and discharging plan formulating unit configured to adjust a charging state of each of the power storage systems during a preliminarily controllable period that is a predetermined period before a start of the DR and formulate a charging and discharging plan for increasing the power resource that is able to be supplied during the execution period of the DR; and a communication unit configured to transmit the charging and discharging plan formulated by the charging and discharging plan formulating unit to the power storage system.

2. The control device according to claim 1, wherein the DR is an up DR for requesting an increase in power demand, and the charging and discharging plan includes a plan for stopping charging of the power storage system during the preliminarily controllable period or a plan for discharging the power storage system during the preliminarily controllable period.

3. The control device according to claim 2, wherein the charging stop or the discharging of the power storage system during the preliminarily controllable period is executed when power crunch occurs in the power grid during the preliminarily controllable period.

4. The control device according to claim 1, wherein the DR is a down DR for requesting a decrease in power demand, and the charging and discharging plan includes a plan for charging the power storage system during the preliminarily controllable period.

5. The control device according to claim 4, wherein the charging of the power storage system during the preliminarily controllable period is executed when there is surplus power in the power grid during the preliminarily controllable period.

6. The control device according to claim 1, wherein the preliminarily controllable period is a period from bidding of the DR to the start of the DR, or a period from contracting of the DR to the start of the DR.

7. The control device according to claim 1, wherein when it is determined that a deviation occurs between the power resource ensured by the resource ensuring unit and a power demand requested by the DR during a period immediately before the start of the DR, the charging and discharging plan formulating unit adjusts the charging state of the power storage system during the period immediately before the start of the DR, and formulates the charging and discharging plan for increasing the power resource that is able to be supplied during the execution period of the DR.

* * * * *